United States Patent
Ryu et al.

(10) Patent No.: US 7,294,994 B2
(45) Date of Patent: Nov. 13, 2007

(54) POWER SUPPLY

(75) Inventors: Takashi Ryu, Kyoto (JP); Takuya Ishii, Osaka (JP); Mikio Motomori, Hirakata (JP); Hiroki Akashi, Hirakata (JP); Hirohisa Tanabe, Nagaokakyo (JP); Makoto Ishimaru, Takatsuki (JP); Tomoya Shigemi, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/333,312

(22) Filed: Jan. 18, 2006

(65) Prior Publication Data
US 2006/0164021 A1   Jul. 27, 2006

(30) Foreign Application Priority Data
Jan. 21, 2005   (JP)   ............................. 2005-013450

(51) Int. Cl.
*G08F 1/575*   (2006.01)
(52) U.S. Cl. ...................... 323/282; 323/288
(58) Field of Classification Search ................ 323/282, 323/283, 284, 285, 288
See application file for complete search history.

(56) References Cited

U.S. PATENT DOCUMENTS 6,737,841 B2 * 5/2004 Wrathall ...................... 323/282
6,963,190 B2 * 11/2005 Asanuma et al. ............ 323/283

FOREIGN PATENT DOCUMENTS

JP   11-119845   4/1999

* cited by examiner

*Primary Examiner*—David H. Vu
(74) *Attorney, Agent, or Firm*—Steptoe & Johnson LLP

(57) ABSTRACT

An output detection feedback section (5) for controlling the power supply output voltage of a converter unit (4) in response to an error signal Ve has an error amplifier (26) for outputting the error signal Ve, a phase compensation circuit (41), a state detection circuit (42), and a response compensation circuit (43) for setting the voltage of a capacitor (29) of the phase compensation circuit (41) to a predetermined value. When output voltage is switched, the output voltage is fixed at the predetermined value in a DC manner while a transitional response of the error signal (Ve) is accelerated, so that the output voltage is changed at a high speed to a desired value and the overshoot and undershoot are suppressed around the desired value.

15 Claims, 5 Drawing Sheets

POWER SUPPLY

FIELD OF THE INVENTION

The present invention relates to a power supply for supplying power supply voltage to a load circuit, and particularly relates to a power supply having the output switching function of switching power supply voltage.

BACKGROUND OF THE INVENTION

In recent years, in order to respond to the expanded functionality and power savings of electronic equipment such as portable equipment, power supply voltages are switched according to an operating state in some cases. FIG. 5 shows a conventional power supply having the function of switching power supply voltages.

The power supply of FIG. 5 is identical to a conventional example shown in FIG. 2 of (Patent Document 1). Reference numeral 1 denotes an input terminal, reference numeral 2 denotes an output terminal, reference numeral 3 denotes a control terminal, reference numeral 4 denotes a converter unit including a series regulator and a switching regulator, and reference numeral 6 denotes an output detection feedback section.

The converter unit 4 has the input terminal 1 and the output terminal 2. The converter unit 4 transforms power supply input voltage Vin, which has been applied to the input terminal 1, to desired output voltage Vout based on an error signal Ve inputted from the output detection feedback section 6. Then, the converter unit 4 outputs the output voltage Vout from the output terminal 2.

The output detection feedback section 6 comprises a series circuit with resistors 31, 32, and 33 for dividing the output voltage Vout, a switch 34 for short-circuiting/opening both ends of the resistor 31 according to a control signal Vs inputted from the control terminal 3, and an error amplifier 36 which compares a voltage at the node of the resistors 32 and 33 with a reference voltage Vref of a voltage source 35, amplifies the voltage, and outputs the error signal Ve.

The converter unit 4 of (Patent Document 1) is a series regulator comprising a P-channel transistor. However, various circuits including switching regulators are suggested and generalized as the converter unit 4.

As described above, the converter unit 4 is a circuit for transforming the power supply input voltage Vin to the desired power supply output voltage Vout according to the error voltage Ve, and the converter unit 4 operates in such a way that the positive and negative input terminals of the error amplifier 36 are equal in voltage. Therefore, the switch 34 is turned on/off in response to the control signal Vs and a voltage division ratio is changed depending upon whether the resistor 31 is short-circuited or not, so that the output voltage Vout can be switched. Assuming that the resistors 31, 32, and 33 have resistances R31, R32, and R33, respectively, when the switch 34 is turned off, an output voltage Vout1 is expressed by the equation below:

$$Vout1 = Vref \cdot (1 + R31/R33 + R32/R33)$$

When the switch 34 is turned on, an output voltage Vout2 is expressed by the equation below:

$$Vout2 = Vref \cdot (1 + R32/R33)$$

In this configuration, however, when the output voltage is changed, the input terminal voltage of the error amplifier 36 considerably changes in a short time. As a result, overshoot or undershoot occurs at the output voltage. In Japanese Patent Laid-Open No. 11-119845, in order to solve this problem, a low-pass filter is inserted to the input of the error amplifier 36 and the low-pass filter is operated for a fixed time period after a voltage division ratio is changed, so that a change of the input terminal voltage to the error amplifier 36 is reduced.

In the conventional power supply, however, when the output voltage is changed, a detected resistance is changed by the switch 34 to change a resistance division ratio. Thus, an input impedance to the error amplifier 36 is changed and the alternating gain of the error amplifier 36 is also changed, which complicates a design for obtaining the control stability of the power supply in response to the switching of the output voltage. Further, when the alternating gain of the error amplifier 36 is reduced by turning off the switch 34, a limitation on overshoot is reduced. The overshoot occurs when the output voltage increases.

Moreover, in Japanese Patent Laid-Open No. 11-119845, in response to overshoot or undershoot occurring on the output voltage, the low-pass filter is inserted to the input of the error amplifier 36 and a change of the input terminal voltage to the error amplifier 36 is reduced, thereby reducing the speed of changing output voltage. That is, even when the switch is operated in response the control signal Vs, output voltage is switched with a time lag.

An object of the present invention is to provide a power supply whereby when output voltage is switched, the output voltage can be quickly switched without causing switching time delay while overshoot and undershoot is reduced, and the control stability of the power supply can be easily obtained in response to a change of the output voltage.

DISCLOSURE OF THE INVENTION

A power supply according to the first aspect of the present invention comprises a converter unit for transforming a power supply input voltage to an output voltage based on an error signal and an output detection feedback section for outputting the error signal according to the output voltage, the output detection feedback section comprising: an error amplifier for outputting the error signal obtained by amplifying a voltage difference between a reference voltage and an output detection voltage obtained from the output voltage, a phase compensation circuit which has a series circuit of a capacitor and a resistor and compensates for a phase of the error amplifier, a state detection circuit for outputting a state signal indicating whether the voltage difference between the output detection voltage and the reference voltage is within a predetermined range, and a response compensation circuit which is fed with the state signal and sets a voltage of the capacitor of the phase compensation circuit to a predetermined value when the voltage difference between the output detection voltage and the reference voltage is beyond the predetermined range.

A power supply according to the second aspect of the present invention the power supply of the first aspect, wherein the response compensation circuit sets the resistor of the phase compensation circuit at a high resistance when the voltage difference between the reference voltage and the output detection voltage is beyond the predetermined range.

A power supply according to the third aspect of the present invention comprises a converter unit for transforming a power supply input voltage to a predetermined power supply output voltage based on an error signal and an output detection feedback section for outputting the error signal according to the power supply output voltage, the output detection feedback section comprising: an error amplifier for outputting the error signal obtained by amplifying a voltage difference between a reference voltage and an output detection voltage obtained from the power supply output voltage, a phase compensation circuit which has a series circuit of a capacitor and a resistor and compensates for a phase of the error amplifier, a state detection circuit for outputting a state signal indicating whether the voltage difference between the output detection voltage and the reference voltage is within a predetermined range, and a response compensation circuit which sets a voltage of the capacitor of the phase compensation circuit to a predetermined value for a predetermined period of time, when the voltage difference between the output detection voltage and the reference voltage is changed from a value beyond the predetermined range to a value within the predetermined range.

A power supply according to the fourth aspect of the present invention is the power supply of the first aspect, wherein the state detection circuit comprises a comparator for outputting the state signal activated when the output detection voltage is higher than the reference voltage by a predetermined voltage or more.

A power supply according to the fifth aspect of the present invention is the power supply of the third aspect, wherein the state detection circuit comprises a comparator for outputting the state signal activated when the output detection voltage is higher than the reference voltage by a predetermined voltage or more.

A power supply according to the sixth aspect of the present invention is the power supply of the first aspect, wherein the state detection circuit comprises a comparator for outputting the state signal activated when the output detection voltage is lower than the reference voltage by a predetermined voltage or more.

A power supply according to the seventh aspect of the present invention the power supply of the third aspect, wherein the state detection circuit comprises a comparator for outputting the state signal activated when the output detection voltage is lower than the reference voltage by a predetermined voltage or more.

A power supply according to the eighth aspect of the present invention is the power supply of the first aspect, wherein the state detection circuit comprises a first comparator for outputting a first signal activated when the output detection voltage is higher than the reference voltage by a predetermined voltage or more, a second comparator for outputting a second signal activated when the output detection voltage is lower than the reference voltage by the predetermined voltage or more, and a logic circuit for outputting the state signal activated when the first signal or the second signal is active.

A power supply according to the ninth aspect of the present invention is the power supply of the third aspect, wherein the state detection circuit comprises a first comparator for outputting a first signal activated when the output detection voltage is higher than the reference voltage by a predetermined voltage or more, a second comparator for outputting a second signal activated when the output detection voltage is lower than the reference voltage by the predetermined voltage or more, and a logic circuit for outputting the state signal activated when the first signal or the second signal is active.

A power supply according to the tenth aspect of the present invention is the power supply of the first aspect, wherein the output detection feedback section comprises an output switching circuit for changing input voltage to the error amplifier in response to a switching signal for switching the output voltage.

A power supply according to the eleventh aspect of the present invention is the power supply of the third aspect, wherein the output detection feedback section comprises an output switching circuit for changing input voltage to the error amplifier in response to a switching signal for switching the output voltage.

A power supply according to the twelfth aspect of the present invention is the power supply of the first aspect, wherein the output detection feedback section comprises an output switching circuit for changing input voltage to the error amplifier in response to a switching signal for switching the output voltage, and the output switching circuit comprises a resistor having one end connected to the node of the detection resistor and the input terminal of the error amplifier, and a switch circuit for selecting and applying a predetermined direct-current voltage to the other end of the resistor in response to the switching signal.

A power supply according to the thirteenth aspect of the present invention is the power supply of the third aspect, wherein the output detection feedback section comprises an output switching circuit for changing input voltage to the error amplifier in response to a switching signal for switching the output voltage, and the output switching circuit comprises a resistor having one end connected to the node of the detection resistor and the input terminal of the error amplifier, and a switch circuit for selecting and applying a predetermined direct-current voltage to the other end of the resistor in response to the switching signal.

According to the power supply of the present invention, when output voltage is switched, the output voltage is fixed at a predetermined value in a DC manner while a transitional response of the error signal outputted by the error amplifier is accelerated, so that an output voltage can be changed at a high speed to a desired value and overshoot and undershoot can be suppressed around the desired value.

In the case where the output switching circuit comprises the resistor having one end connected to the node of the detection resistor and the input terminal of the error amplifier, and the switch circuit for selecting and applying the predetermined direct-current voltage to the other end of the resistor in response to the switching signal, the alternating gain of the error amplifier is invariant regardless of the switching of the output voltage. Thus, it is possible to easily obtain the control stability of the power supply in response to a change of the output voltage.

DESCRIPTION OF THE EMBODIMENTS

The power supply of the present invention will be described below in accordance with embodiments of the present invention.

(Embodiment 1)

Figure 1:
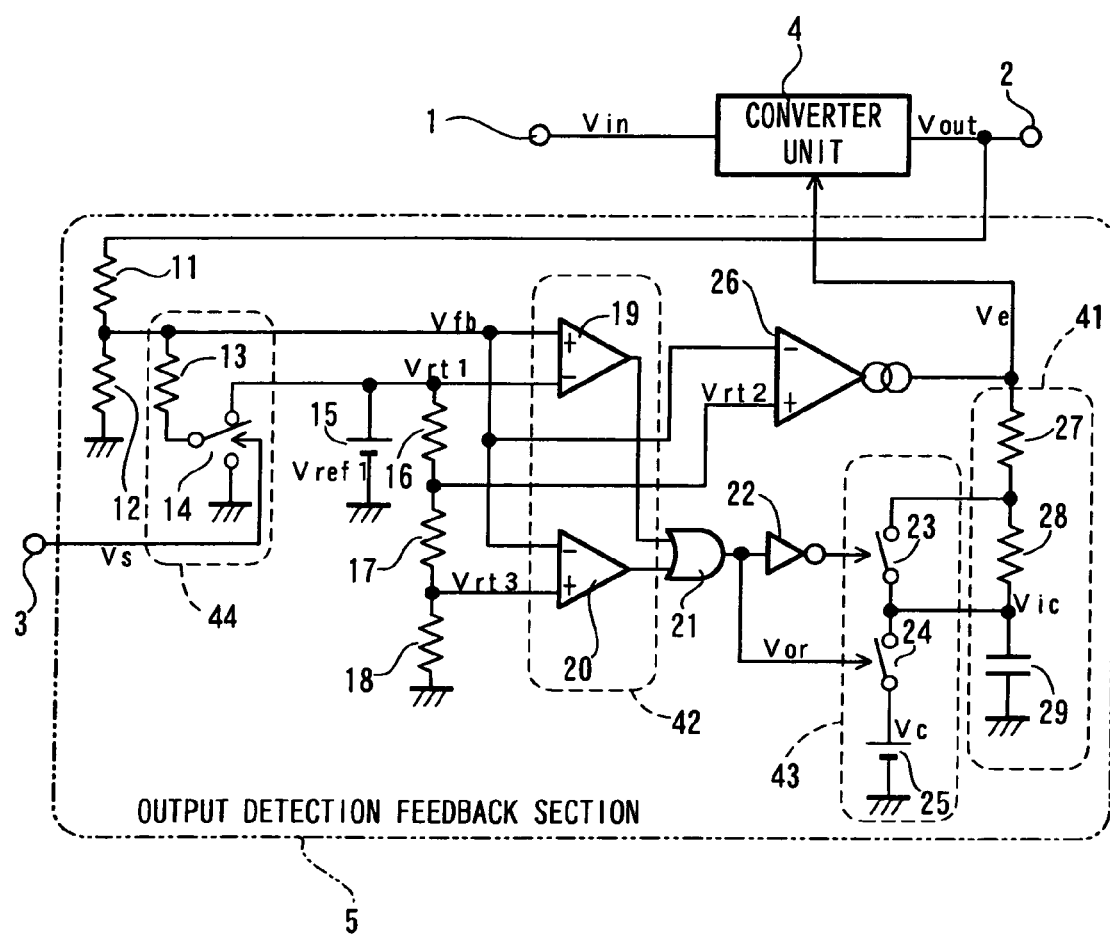
FIG. 1 is a circuit diagram showing a power supply according to Embodiment 1 of the present invention.
Figure 2:
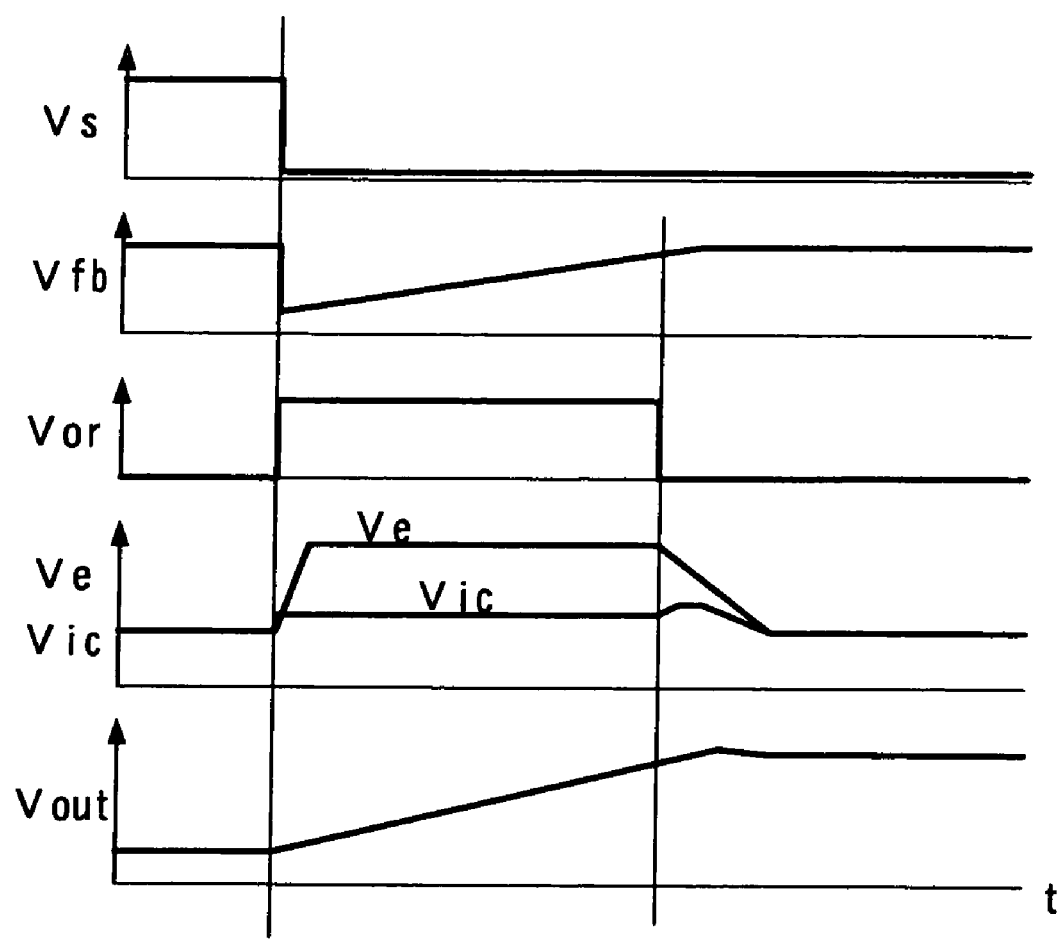
FIG. 2 is an operation waveform diagram according to Embodiment 1.

FIGS. 1 and 2 show (Embodiment 1) of the present invention.

FIG. 1 shows a power supply according to (Embodiment 1) of the present invention.

Reference numeral 1 denotes an input terminal, reference numeral 2 denotes an output terminal, reference numeral 3 denotes a control terminal, reference numeral 4 denotes a converter unit including a series regulator and a switching regulator, and reference numeral 5 denotes an output detection feedback section.

The converter unit 4 transforms power supply input voltage, which has been inputted to the input terminal 1, to desired output voltage Vout based on an error signal Ve inputted from the output detection feedback section 5, and outputs the output voltage from the output terminal 2.

The output detection feedback section 5 comprises resistors 11, 12, and 13, a switch circuit 14, a voltage source 15 for outputting a first reference voltage Vref1, resistors 16, 17, and 18, comparators 19 and 20, an OR gate 21, an inverter 22, switch circuits 23 and 24, a voltage source 25 for outputting a second reference voltage Vc, an error amplifier 26, resistors 27 and 28, and a capacitor 29.

The comparators 19 and 20 make up a state detection circuit 42 for outputting a state signal indicating whether a voltage difference between an output detection voltage Vfb and a reference voltage Vrt2 is within a predetermined range. A series circuit with the capacitor 29 and the resistors 27 and 28 makes up a phase compensation circuit 41 of the error amplifier 26. The switch circuits 23 and 24 make up a response compensation circuit 43 for reducing the voltage of the capacitor 29 of the phase compensation circuit 41 to a predetermined value when a voltage difference between the output detection voltage Vfb and the reference voltage Vrt2 is beyond the predetermined range. The resistor 13 and the switch circuit 14 make up an output switching circuit 44 for changing an input detection voltage to the error amplifier 26 according to a control signal Vs serving as a switching signal for switching the output voltage.

To be specific, the resistors 11 and 12 connected in series divide a power supply output voltage Vout of the output terminal 2 and output an output detection voltage Vfb. The resistor 13 has one end connected to the node of the resistor 11 and the resistor 12 and the other end connected to the common terminal of the switch circuit 14.

The switch circuit 14 connects the other end of the resistor 13 to the voltage source 15 or grounds the other end according to the control signal Vs from the control terminal 3.

In this case, when the control signal Vs is at "H" level, the switch circuit 14 applies the first reference voltage Vref1 to the other end of the resistor 13. When the control signal Vs is at "L" level, the switch circuit 14 grounds the other end of the resistor 13. The voltage at the node of the resistors 11, 12, and 13 is also changed by the switching of the switch circuit 14. The voltage at this node is referred to as the output detection voltage Vfb.

A voltage Vrt1 at the node of the switch circuit 14 and the voltage source 15 is divided by the resistors 16, 17, and 18 connected in series, and a voltage Vrt2 and a voltage Vrt3 are outputted. The resistors 16, 17, and 18 have resistances R16, R17, and R18, respectively.

The comparator 19 has a positive input terminal (+) applied with the output detection voltage Vfb at the node of the resistor 11, the resistor 12, and the resistor 13, and a negative input terminal (−) applied with the voltage Vrt1 at the node of the switch circuit 14 and the voltage source 15.

The comparator 20 has a negative input terminal (−) applied with the output detection voltage Vfb at the node of the resistor 11, the resistor 12, and the resistor 13 and a positive input terminal (+) applied with the voltage Vrt3 at the node of the resistor 17 and the resistor 18 is applied.

$$Vrt3 = Vrt1 \cdot R18/(R16+R17+R18)$$

The outputs of the comparators 19 and 20 are inputted to the OR gate 21. The OR gate 21 turns on/off the switch circuit 24 and turns on/off the switch circuit 23 through the inverter 22.

The switch circuits 23 and 24 are turned on when input signals are at "H" level. That is, when the output signal of the OR gate 21 is at "H" level, the switch circuit 23 is turned off and the switch circuit 24 is turned on. When the output signal of the OR gate 21 is at "L" level, the switch circuit 23 is turned on and the switch circuit 24 is turned off. The switch circuit 24 has one end connected to the capacitor 29 and the other end connected to the voltage source 25. When the switch circuit 24 is turned on, the second reference voltage Vc outputted from the voltage source 25 is applied to the capacitor 29. The switch circuit 23 is connected in parallel with the resistor 28. The resistor 28 is short-circuited when the switch circuit 23 is turned on.

The error amplifier 26 has a negative input terminal (−) applied with the output detection voltage Vfb at the node of the resistor 11, the resistor 12, and the resistor 13, and has a positive input terminal (+) applied with the voltage Vrt2 at the node of the resistor 16 and the resistor 17.

$$Vrt2 = Vrt1 \cdot (R17+R18)/(R16+R17+R18)$$

The resistor 27 has one end connected to the output terminal of the error amplifier 26 and the other end grounded through the resistor 28 and the capacitor 29. A signal at the node of the resistor 27 and the output terminal of the error amplifier 26 is supplied as the error signal Ve to the converter unit 4.

The following will mainly discuss the operations of the output detection feedback section 5 in the power supply of FIG. 1.

The first is the case where the control signal Vs is at "L" level.

In this case, the resistor 13 is grounded through the switch circuit 14. Thus, when the power supply output voltage is Vout, the resistor 11 has a resistance of R11, the resistor 12 has a resistance of R12, and the resistor 13 has a resistance of R13, a voltage Vx is applied as the output detection voltage Vfb to the negative input terminal (−) of the error amplifier 26. The voltage Vx is expressed by the equation below:

$$Vx = Vout \cdot R12 \cdot R13/\{R11 \cdot (R12+R13)+R12 \cdot R13\}$$

The converter unit 4 adjusts, by means of negative feedback of the output detection feedback section, the power supply output voltage Vout so that the voltage Vx becomes equal to the voltage Vrt2 applied to the positive input terminal (+) of the error amplifier 26. Thus, when the control signal Vs is at "L" level, the power supply output voltage Vout1 is expressed by the equation below:

$$Vout1 = Vrt2 \cdot (1+R11/R12+R11/R13)$$

The following is the case where the control signal Vs is at "H" level.

In this case, the first reference voltage Vref1 is applied to the resistor 13 through the switch circuit 14 and thus a voltage Vy is applied as the output detection voltage Vfb to the negative input terminal (−) of the error amplifier 26. The voltage Vy is expressed by the equation below:

$$Vy=\{Vout \cdot R12 \cdot R13 + Vrt1 \cdot R11 \cdot R12\}/\{R11 \cdot (R12+R13) + R12 \cdot R13\}$$

The converter unit 4 adjusts the power supply output voltage Vout in such a way that the voltage Vy is equal to the voltage Vrt2. Thus, when the control signal Vs is at "H" level, a power supply output voltage Vout2 is expressed by the equation below:

$$Vout2 = Vrt2 \cdot (1 + R11/R12 + R11/R13) - Vrt1 \cdot R11/R13$$

The voltage Vrt1 applied to the negative input terminal (−) of the comparator 19 is expressed by the equation below:

$$Vrt1 = Vrt2 \cdot (R16+R17+R18)/(R17+R18)$$

In this case, a=(R16+R17+R18)/(R17+R18) is established and a is set around "1.05". A voltage Vrt3 applied to the positive input terminal (−) of the comparator 20 is expressed by the equation below:

$$Vrt3 = Vref2 \cdot R18/(R17+R18)$$

In this case, b=R18/(R17+R18) is established and b is set around "0.95".

Therefore, in the case of the control signal Vs at "L" level, when the power supply output voltage Vout is higher than (Vout1·a), the comparator 19 outputs "H" level. When the power supply output voltage Vout is lower than (Vout1·a), the comparator 19 outputs "L" level.

When the power supply output voltage Vout is higher than (Vout1·b), the comparator 20 outputs "L" level. When the power supply output voltage Vout is lower than (Vout1·b), the comparator 20 outputs "H" level.

Further, in the case of the control signal Vs at "H" level, when the power supply output voltage Vout is higher than (Vout2·a), the comparator 19 outputs "H" level. When the power supply output voltage Vout is lower than (Vout2·a), the comparator 19 outputs "L" level.

When the power supply output voltage Vout is higher than (Vout2·b), the comparator 20 outputs "L" level. When the power supply output voltage Vout is lower than (Vout2·b), the comparator 20 outputs "H" level.

As described above, in the case of a=1.05 and b=0.95, when the power supply output voltage Vout is within ±5% relative to the power supply output voltage Vout1 or Vout2, the comparators 19 and 20 both output "L" level. Thus, the OR gate 21 also outputs "L" level, the switch circuit 23 is turned on, and the switch circuit 24 is turned off.

Conversely, when the power supply output voltage Vout is beyond ±5% relative to a desired value, one of the comparators 19 and 20 outputs "H" level. Thus, the OR gate 21 also outputs "H" level, the switch circuit 23 is turned off, and the switch circuit 24 is turned on.

The following will discuss operations performed when the control signal Vs is switched from "H" level to "L" level.

It is assumed that when the control signal Vs is at "H" level, the power supply output voltage Vout is stabilized to the power supply output voltage Vout 2 of the foregoing equation. When the control signal Vs is switched from "H" level to "L" level, a voltage applied to the negative input terminal (−) of the error amplifier 26 and a voltage applied to the positive input terminal (+) of the comparator 19 and the negative input terminal (−) of the comparator 20 rapidly decrease. Therefore, the error amplifier 26 increases its output voltage, and the comparator 20 outputs "H" level to turn off the switch circuit 23 and turn on the switch circuit 24. Thus, the second reference voltage Vc is applied to the capacitor 29 and the resistor 28 is connected in series with the resistor 27.

Meanwhile, current from the error amplifier 26 passes through the series circuit of the resistor 27 and the resistor 28 and causes a voltage drop, by which the error signal Ve rises immediately. As the error signal Ve rises, the converter unit 4 increases power supply to the output terminal 2 and increases the power supply output voltage Vout. When the power supply output voltage Vout reaches (Vout1·b), the comparator 20 outputs "L" level. Since the output signal of the comparator 19 is originally set at "L" level, the output signal of the OR gate 21 is set to "L" level, which turns on the switch circuit 23 and turns off the switch circuit 24. Thus, charging to the capacitor 29 is started.

Therefore, when the power supply output voltage Vout reaches the power supply output voltage Vout1, the series circuit of the resistor 27 connected to the output of the error amplifier 26 and the capacitor 29 functions as a time constant circuit. Thereby, a smooth stabilizing operation is performed with the overshoot of the power supply output voltage Vout being suppressed.

If the capacitor 29 is not fixed at the second reference voltage Vc, when the power supply output voltage Vout reaches the power supply output voltage Vout1, the capacitor 29 would be excessively charged and the error signal Ve would fall late. Thus, excessive power would be supplied to the output terminal 2 of the converter unit 4, resulting in overshoot to the power supply output voltage Vout.

If the resistor 28 is not connected, even when current outputted from the error amplifier 26 increases, the error signal Ve would rise late only by voltage drop on the resistor 27 and the power supply output voltage Vout would also increase late, resulting in a long response time.

FIG. 2 is an operation waveform when the control signal Vs is switched from "H" level to "L" level in the power supply of FIG. 1. FIG. 2 shows, from above, the waveforms of the control signal Vs, the output detection voltage Vfb applied to the negative input terminal (−) of the error amplifier 26, the positive input terminal (+) of the comparator 19, and the negative input terminal (−) of the comparator 20, output signal Vor of the OR gate 21, the error signal Ve, voltage Vic of the capacitor 29, and the power supply output voltage Vout.

The following will discuss operations performed when the control signal Vs is switched from "L" level to "H" level.

It is assumed that when the control signal Vs is at "L" level, the power supply output voltage Vout is stabilized to Vout1 of the foregoing equation. When the control signal Vs is switched from "L" level to "H" level, a voltage applied to the negative input terminal (−) of the error amplifier 26 and a voltage applied to the positive input terminal (+) of the comparator 19 and the negative input terminal (−) of the comparator 20 rapidly increase. Therefore, the error amplifier 26 reduces its output voltage, and the comparator 19 outputs "H" level to turn off the switch circuit 23 and turn on the switch circuit 24. Thus, the second reference voltage Vc is applied to the capacitor 29, and the resistor 28 is connected in series with the resistor 27. Meanwhile, current to the error amplifier 26 passes through the series circuit of the resistor 27 and the resistor 28 and causes voltage drop, by which the error signal Ve falls immediately. As the error signal Ve falls, the converter unit 4 reduces power supply to the output terminal 2 and reduces the power supply output voltage Vout. When the power supply output voltage Vout reaches (Vout2·a), the comparator 19 outputs "L" level.

Since the comparator 20 is originally set at "L" level, the output signal of the OR gate 21 is set to "L" level, which turns on the switch circuit 23 and turns off the switch circuit 24. Thus, discharging to the capacitor 29 is started. Therefore, when the power supply output voltage Vout reaches the desired value Vout2, the series circuit of the resistor 27 connected to the output of the error amplifier 26 and the capacitor 29 functions as a time constant circuit. Thereby, a smooth stabilizing operation is performed with the undershoot of the power supply output voltage Vout being suppressed. If the capacitor 29 is not fixed at the second reference voltage Vc, when the power supply output voltage Vout reaches the desired value Vout2, the capacitor 29 would be excessively discharged and the error signal Ve having excessively fallen would rise late. Thus, power supply from the converter unit 4 to the output terminal 2 would become insufficient and undershoot would occur at the power supply output voltage Vout.

If the resistor 28 is not connected, even when current drawn to the error amplifier 26 increases, the error signal Ve would fall late only by voltage drop on the resistor 27 and the power supply output voltage Vout would also decrease late, resulting in a long response time.

In the embodiment of FIG. 1, the function of increasing a resistance by turning off the switch circuit 23 to add the resistor 28 in series with the resistor 27 and the function of turning on the switch circuit 24 to apply the second reference voltage Vc to the capacitor 29 are performed in parallel. It is not always necessary to perform the functions in parallel to obtain an effect. Depending on load conditions, the same effect can be obtained only by one of the functions.

Further, in the embodiment of FIG. 1, the configuration for switching power supply output voltage comprises the resistors 11 and 12 for detecting power supply output voltage, the resistor 13, the switch circuit 14, and the voltage source 15. With this configuration, regardless of a state of the switch circuit 14, a resistance between the output terminal 2 and the negative input terminal (−) of the error amplifier 26 is equal to the resistance of the resistor 11. Since the voltage source 15 is low in impedance in an AC manner and is equivalent to the ground in the AC manner, an alternating-current resistance between the ground and the negative input terminal (−) of the error amplifier 26 is equal to a resistance of the parallel resistance of the resistor 12 and the resistor 13. Therefore, the transfer characteristic of an alternating current signal from the output terminal 2 to the negative input terminal (−) of the error amplifier 26 is determined by a division ratio of the resistance of the resistor 11 and the resistance of the parallel resistance of the resistor 12 and the resistor 13, and the transfer characteristic is constant regardless of a state of the switch circuit 14. In other words, regardless of a state of the switch circuit 14, a circuit constant relating to the response characteristic of the error amplifier 26 does not change, and the alternating transfer characteristic of the error amplifier is invariant. With this configuration, in response to the switching of power supply output voltage, it is possible to easily design the transfer characteristic of a system for obtaining the control stability of the power supply, achieving the most suitable design.

(Embodiment 2)

Figure 3:
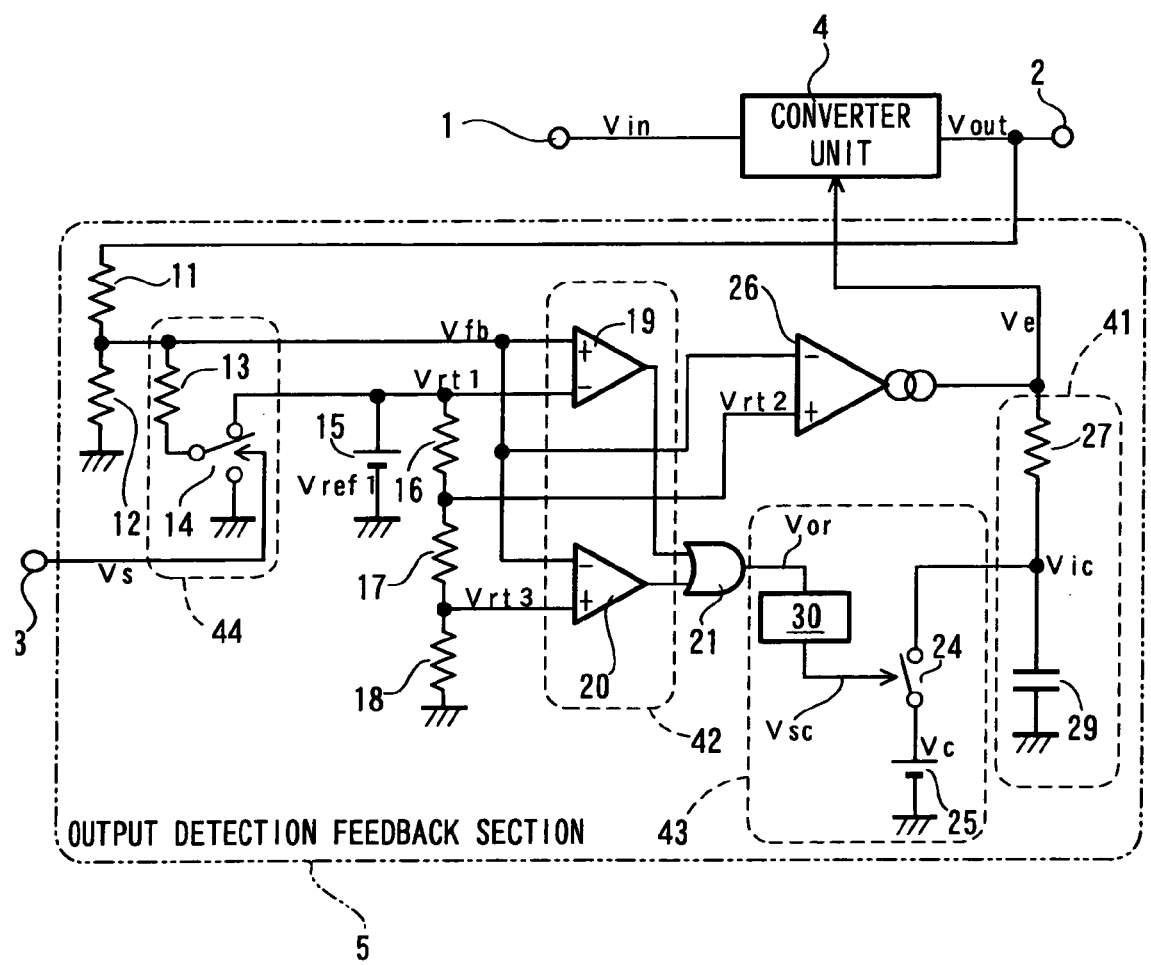
FIG. 3 is a circuit diagram showing a power supply according to Embodiment 2 of the present invention.
Figure 4:
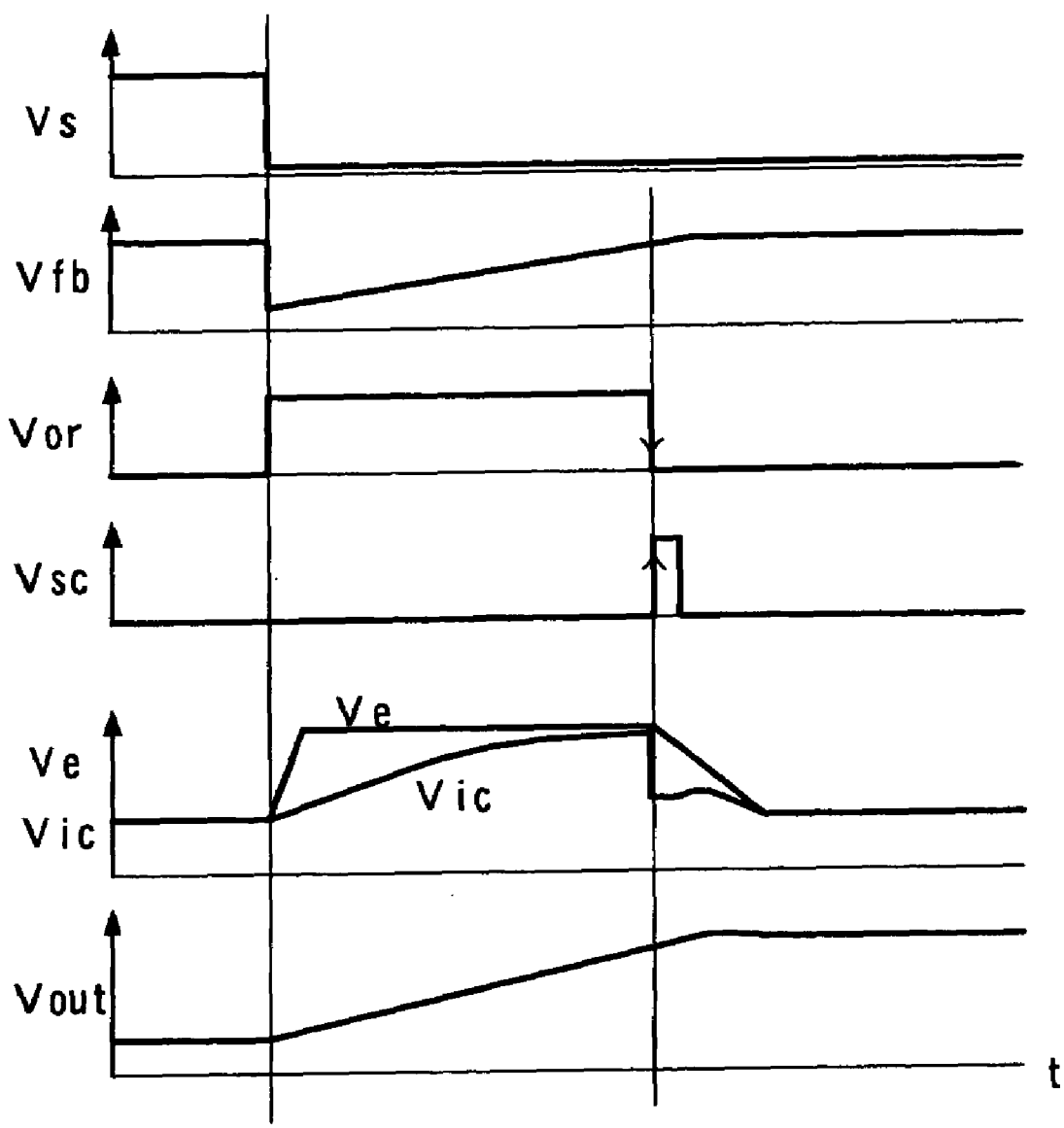
FIG. 4 is an operation waveform diagram according to Embodiment 2.
Figure 5:
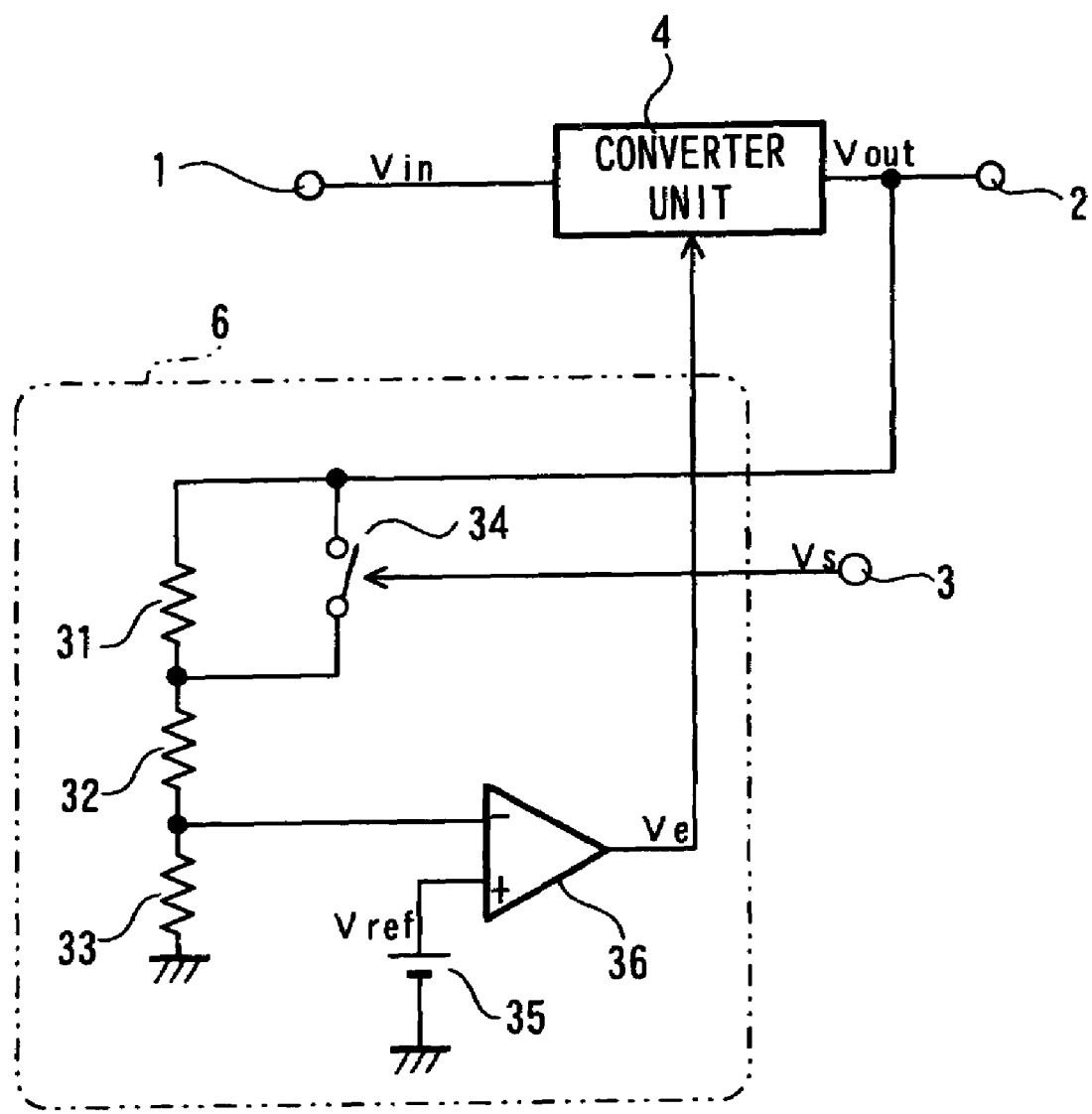
FIG. 5 is a circuit diagram showing a conventional power supply.

FIGS. 3 and 4 show (Embodiment 2) of the present invention.

FIG. 3 shows a power supply according to (Embodiment 2) of the present invention. The power supply is different from that of FIG. 1 only in the following point:

In FIG. 3, a monostable multivibrator 30 is inserted between the OR gate 21 and the switch circuit 24 of FIG. 1. The output of the monostable multivibrator 30 turns on/off the switch circuit 24. The inverter 22, the switch circuit 23, and the resistor 28 of FIG. 1 are omitted.

The monostable multivibrator 30 has the function of outputting a predetermined signal for a predetermined period of time after an input signal outputted from the OR gate 21 is changed. When the input signal is switched from "H" level to "L" level, the monostable multivibrator 30 outputs a signal to be set at "H" level to the output for the predetermined period of time.

The first is operations performed when a control signal Vs is switched from "H" level to "L" level. It is assumed that when the control signal Vs is at "H" level, the power supply output voltage Vout is stabilized at the power supply output voltage Vout2 of the foregoing equation.

In this case, when the control signal Vs is switched from "H" level to "L" level, a voltage applied to the negative input terminal (−) of an error amplifier 26 and a voltage applied to the positive input terminal (+) of a comparator 19 and the negative input terminal (−) of a comparator 20 rapidly decrease. Therefore, the error amplifier 26 increases its output voltage, the comparator 20 outputs "H" level, and the output signal of the OR gate 21 is set to "H" level. The monostable multivibrator 30 stays at "L" level regardless of the output signal when the input signal is switched from "L" level to "H" level, and thus the switch circuit 24 is kept in an off state. Meanwhile, current from the error amplifier 26 passes through a resistor 27 and increases the voltage of a capacitor 29, and thus an error signal Ve rises immediately due to a voltage drop of the resistor 27 and a voltage change of the capacitor 29. As the error signal Ve rises, a converter unit 4 increases power supply to an output terminal 2, increasing a power supply output voltage Vout. When the power supply output voltage Vout reaches (Vout1·b), the comparator 20 outputs "L" level. Since the comparator 19 is originally set at "L" level, the output signal of the OR gate 21 is switched from "H" level to "L" level. In response to the change of the input signal, the output signal of the monostable multivibrator 30 is switched from "L" level to "H" level. The output is returned to "L" level after a lapse of a predetermined period of time. In a time period during which the output of the monostable multivibrator 30 is set at "H" level, the switch circuit 24 is turned on and second reference voltage Vc is applied to the capacitor 29. Charge in the capacitor 29 is immediately discharged. The charge has been accumulated in a time period during which a power supply output voltage Vout is lower than a predetermined voltage. When the output of the monostable multivibrator 30 returns to "L" level, the switch circuit 24 is turned off and charging/discharging to and from the capacitor 29 is started.

Therefore, when the power supply output voltage Vout reaches a desired value Vout1, the series circuit of the resistor 27 and the capacitor 29 connected to the output of the error amplifier 26 functions as a time constant circuit. Thereafter, by means of the function of the time constant circuit, a smooth stabilizing operation is performed with the overshoot to the power supply output voltage Vout being suppressed. If the second reference voltage Vc is not applied to the capacitor 29, when the power supply output voltage Vout reaches the desired value Vout1, the capacitor 29 would be excessively discharged and the error signal Ve would decrease late. Thus, excessive power would be supplied to the output terminal 2 of the converter unit 4, resulting in overshoot to the power supply output voltage Vout.

FIG. 4 shows operation waveforms when the control signal Vs is switched from "H" level to "L" level in the power supply of FIG. 3. FIG. 4 shows, from above, the waveforms of the control signal Vs, the output detection voltage Vfb applied to the negative input terminal (−) of the error amplifier 26, the positive input terminal (+) of the comparator 19, and the negative input terminal (−) of the comparator 20, output signal Vor of the OR gate 21, output signal Vsc of the monostable multivibrator 30, the error signal Ve, voltage Vic of the capacitor 29, and the power supply output voltage Vout.

The following will discuss operations performed when the control signal Vs is switched from "L" level to "H" level.

It is assumed that when the control signal Vs is at "L" level, the power supply output voltage Vout is stabilized to the power supply output voltage Vout1 of the foregoing equation. When the control signal Vs is switched from "L" level to "H" level, a voltage applied to the negative input terminal (−) of the error amplifier 26 and a voltage applied to the positive input terminal (+) of the comparator 19 and the negative input terminal (−) of the comparator 20 rapidly increase. Thus, the error amplifier 26 reduces its output voltage, the comparator 19 outputs "H" level, and the output signal of the OR gate 21 is set to "H" level. The monostable multivibrator 30 stays at "L" level regardless of the output signal when the input signal is switched from "L" level to "H" level, and thus the switch circuit 24 is kept in an off state. Meanwhile, current to the error amplifier 26 passes through the resistor 27 and reduces the voltage of the capacitor 29, and thus the error signal Ve falls immediately due to a voltage drop of the resistor 27 and a voltage change of the capacitor 29. Since the error signal Ve falls, the converter unit 4 reduces power supply to the output terminal 2 and reduces the power supply output voltage Vout. When the power supply output voltage Vout reaches (Vout2·a), the comparator 19 outputs "L" level. Since the comparator 20 is originally set at "L" level, the output signal of the OR gate 21 is switched from "H" level to "L" level. In response to the change of the input signal, the output of the monostable multivibrator 30 is switched from "L" level to "H" level and returned to "L" level after a lapse of the predetermined period of time. In a time period during which the output of the monostable multivibrator 30 is at "H" level, the switch circuit 24 is turned on, the second reference voltage Vc is applied to the capacitor 29, and then the capacitor 29 is immediately charged. The capacitor 29 has been discharged in a time period during which the power supply output voltage Vout is higher than the predetermined voltage.

When the output signal of the monostable multivibrator 30 returns to "L" level, the switch circuit 24 is turned off and charging/discharging to and from the capacitor 29 is started. Therefore, when the power supply output voltage Vout reaches the desired value Vout1, the series circuit of the resistor 27 connected to the error amplifier 26 and the capacitor 29 functions as a time constant circuit. Thereafter, a smooth stabilizing operation is performed with the overshoot to the power supply output voltage Vout being suppressed. If the second reference voltage Vc is not applied to the capacitor 29, when the power supply output voltage Vout reaches the desired value Vout1, the capacitor 29 would be excessively charged and the error signal Ve would decrease late. Thus, power supply to the output terminal 2 of the converter unit 4 would become insufficient and undershoot would occur at the power supply output voltage Vout.

As described above, according to the power supply of the present invention, when power supply output voltage is switched, the output voltage is fixed at a predetermined value in a DC manner while a transitional response of the error signal outputted by the error amplifier is being accelerated. Thereby, an output voltage is changed at a high speed to a desired value, and the overshoot and undershoot can be reduced around the desired value. Further, the alternating gain of the error amplifier is invariant regardless of the switching of the output voltage, thereby easily obtaining the control stability of the power supply in response to a change of the output voltage.

The present invention is useful to a power supply having the output switching function of switching power supply voltage supplied to a load circuit.

What is claimed is:

1. A power supply, comprising:
    a converter unit for transforming power supply input voltage to a predetermined power supply output voltage based on an error signal, and
    an output detection feedback section for outputting the error signal according to the power supply output voltage,
    the output detection feedback section comprising:
    an error amplifier for outputting the error signal obtained by amplifying a voltage difference between a reference voltage and an output detection voltage obtained from the power supply output voltage,
    a phase compensation circuit having a circuit of a capacitor and a resistor to compensate a phase of the error amplifier,
    a state detection circuit for outputting a state signal indicating whether the voltage difference between the output detection voltage and the reference voltage is within a predetermined range, and
    a response compensation circuit for inputting thereinto the state signal, and setting a voltage of the capacitor of the phase compensation circuit to a predetermined value when the voltage difference between the output detection voltage and the reference voltage is beyond the predetermined range.

2. The power supply according to claim 1, wherein the response compensation circuit sets the resistor of the phase compensation circuit at a high resistance when the voltage difference between the reference voltage and the output detection voltage is beyond the predetermined range.

3. A power supply, comprising:
    a converter unit for transforming power supply input voltage to a predetermined power supply output voltage based on an error signal, and
    an output detection feedback section for outputting the error signal according to the power supply output voltage,
    the output detection feedback section comprising:
    an error amplifier for outputting the error signal obtained by amplifying a voltage difference between a reference voltage and an output detection voltage obtained from the power supply output voltage,
    a phase compensation circuit having a circuit of a capacitor and a resistor to compensate a phase of the error amplifier,
    a state detection circuit for outputting a state signal indicating whether the voltage difference between the output detection voltage and the reference voltage is within a predetermined range, and
    a response compensation circuit for setting a voltage of the capacitor of the phase compensation circuit to a predetermined value for a predetermined period of time, when the voltage difference between the output detection voltage and the reference voltage is changed from a value beyond the predetermined range to a value within the predetermined range.

4. The power supply according to claim 1, wherein the state detection circuit comprises a comparator for outputting the state signal activated when the output detection voltage is higher than the reference voltage by a predetermined voltage or more.

5. The power supply according to claim 3, wherein the state detection circuit comprises a comparator for outputting the state signal activated when the output detection voltage is higher than the reference voltage by a predetermined voltage or more.

6. The power supply according to claim 1, wherein the state detection circuit comprises a comparator for outputting the state signal activated when the output detection voltage is lower than the reference voltage by a predetermined voltage or more.

7. The power supply according to claim 3, wherein the state detection circuit comprises a comparator for outputting the state signal activated when the output detection voltage is lower than the reference voltage by a predetermined voltage or more.

8. The power supply according to claim 1, wherein the state detection circuit comprises:
  a first comparator for outputting a first signal activated when the output detection voltage is higher than the reference voltage by a predetermined voltage or more,
  a second comparator for outputting a second signal activated when the output detection voltage is lower than the reference voltage by the predetermined voltage or more, and
  a logic circuit for outputting the state signal activated when one of the first signal and the second signal is active.

9. The power supply according to claim 3, wherein the state detection circuit comprises:
  a first comparator for outputting a first signal activated when the output detection voltage is higher than the reference voltage by a predetermined voltage or more,
  a second comparator for outputting a second signal activated when the output detection voltage is lower than the reference voltage by the predetermined voltage or more, and
  a logic circuit for outputting the state signal activated when one of the first signal and the second signal is active.

10. The power supply according to claim 1, wherein the output detection feedback section comprises an output switching circuit for changing input voltage to the error amplifier in response to a switching signal for switching the output voltage.

11. The power supply according to claim 3, wherein the output detection feedback section comprises an output switching circuit for changing input voltage to the error amplifier in response to a switching signal for switching the output voltage.

12. The power supply according to claim 1, wherein the output detection feedback section comprises an output switching circuit for changing input voltage to the error amplifier in response to a switching signal for switching the output voltage, and
  the output switching circuit comprises a resistor having one end connected to a node of the detection resistor and an input terminal of the error amplifier, and a switch circuit for selecting and applying a predetermined direct-current voltage to the other end of the resistor in response to the switching signal.

13. The power supply according to claim 3, wherein the output detection feedback section comprises an output switching circuit for changing input voltage to the error amplifier in response to a switching signal for switching the output voltage, and
  the output switching circuit comprises a resistor having one end connected to a node of the detection resistor and an input terminal of the error amplifier, and a switch circuit for selecting and applying a predetermined direct-current voltage to the other end of the resistor in response to the switching signal.

14. A power supply according to claim 1, wherein the phase compensation circuit is a series circuit of the capacitor and the resistor.

15. A power supply according to claim 3, wherein the phase compensation circuit is a series circuit of the capacitor and the resistor.

* * * * *